United States Patent
Massow et al.

(10) Patent No.: US 12,186,941 B2
(45) Date of Patent: Jan. 7, 2025

(54) METHOD FOR HOMOGENOUSLY INCORPORATING FILLER INTO A SELF-ADHESIVE COMPOUND, IN PARTICULAR A THERMALLY CROSSLINKABLE SELF-ADHESIVE COMPOUND, BASED ON NON-THERMOPLASTIC ELASTOMER

(71) Applicant: TESA SE, Norderstedt (DE)

(72) Inventors: Klaus Massow, Hamburg (DE); Tillmann Köpke, Hamburg (DE)

(73) Assignee: TESA SE, Norderstedt (DE)

( * ) Notice: Subject to any disclaimer, the term of this patent is extended or adjusted under 35 U.S.C. 154(b) by 1055 days.

(21) Appl. No.: 17/042,340

(22) PCT Filed: Mar. 15, 2019

(86) PCT No.: PCT/EP2019/056629
§ 371 (c)(1),
(2) Date: Dec. 2, 2020

(87) PCT Pub. No.: WO2019/185374
PCT Pub. Date: Oct. 3, 2019

(65) Prior Publication Data
US 2021/0094204 A1    Apr. 1, 2021

(30) Foreign Application Priority Data
Mar. 27, 2018   (DE) .................... 10 2018 204 594.1

(51) Int. Cl.
B29B 7/74    (2006.01)
B29B 7/00    (2006.01)
(Continued)

(52) U.S. Cl.
CPC ............ *B29B 7/7495* (2013.01); *B29B 7/007* (2013.01); *B29B 7/485* (2013.01); *B29B 7/603* (2013.01);
(Continued)

(58) Field of Classification Search
None
See application file for complete search history.

(56) References Cited

U.S. PATENT DOCUMENTS 4,133,731 A    1/1979   Hansen et al.
4,820,746 A    4/1989   Rice et al.
(Continued)

FOREIGN PATENT DOCUMENTS

DE    102008062368 A1    6/2010
EP       0447855 A2       9/1991
(Continued)

OTHER PUBLICATIONS

German Office Action for corresponding application DE 10 2018 204 594.1 dated Jul. 25, 2018.
(Continued)

*Primary Examiner* — Robert T Butcher
(74) *Attorney, Agent, or Firm* — Norris McLaughlin, PA

(57) ABSTRACT

The invention relates to a method for homogenously incorporating filler into a self-adhesive compound, in particular a thermally crosslinkable self-adhesive compound, based on non-thermoplastic elastomer in a continuously working unit with a filling part and a compounding part. The self-adhesive compound contains at least one solid component, at least one liquid component, and at least one filler, and the method has the following steps: (a) feeding at least part of the at least one solid component, such as the non-thermoplastic elastomer in particular, and optionally part of the at least one liquid component to the filling part; (b) transferring the
(Continued)

Figure 1:
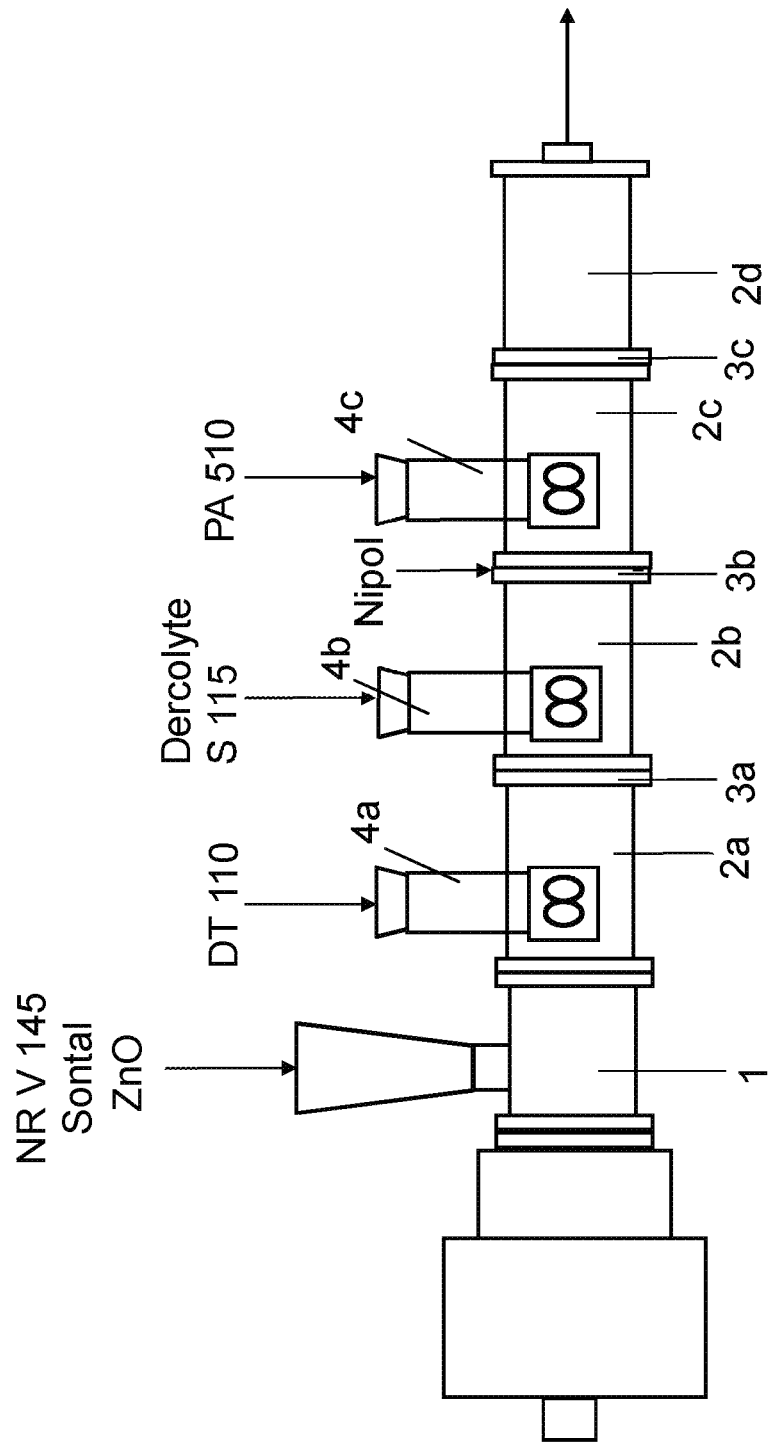

components of step (a) from the filling part to the compounding part; (c) optionally adding additional solid components or additional parts of the solid components to the compounding part; (d) adding the at least one liquid component to the compounding part if the liquid component was not already added to the filling part in step (a); (e) producing a homogenous self-adhesive compound in the compounding part; and (f) discharging the self-adhesive compound. The invention is characterized in that at least part of the at least one filler is pre-dispersed into at least one dispersion liquid in a separate unit and the dispersion obtained in this manner is added to the compounding part. The method prevents high sheering or frictional energies while introducing the filler into the compounding part of the continuously working unit and thus allows the use of temperature-sensitive components, such as temperature-sensitive chemical crosslinking agents in particular.

19 Claims, 5 Drawing Sheets

(51) Int. Cl.
| | | |
|---|---|---|
| *B29B 7/48* | (2006.01) | |
| *B29B 7/60* | (2006.01) | |
| *B29C 48/00* | (2019.01) | |
| *B29C 48/44* | (2019.01) | |
| *B29K 21/00* | (2006.01) | |
| *B29K 105/00* | (2006.01) | |
| *C09J 7/38* | (2018.01) | |
| *C09J 11/04* | (2006.01) | |

(52) U.S. Cl.
CPC ............ *B29C 48/022* (2019.02); *B29C 48/44* (2019.02); *C09J 7/383* (2018.01); *C09J 11/04* (2013.01); *B29C 2948/92885* (2019.02); *B29K 2021/003* (2013.01); *B29K 2105/0038* (2013.01); *B29K 2105/0097* (2013.01)

(56) References Cited

U.S. PATENT DOCUMENTS 6,280,074 B1 *  8/2001  Kuroda ................ B29B 7/7495
                                                      425/207
6,780,271 B1 *  8/2004  Burmeister ............ B29B 7/485
                                                      156/244.11

FOREIGN PATENT DOCUMENTS

| EP | 0854178 A1 | 7/1998 |
| EP | 0960923 A1 | 12/1999 |
| EP | 2610289 A2 | 7/2013 |
| EP | 1056584 B2 | 12/2015 |
| WO | 9942276 A1 | 8/1999 |

OTHER PUBLICATIONS

International Search Report and Written Opinion of the International Searching Authority for corresponding application PCT/EP2019/056629 dated Jul. 4, 2019.

* cited by examiner

METHOD FOR HOMOGENOUSLY INCORPORATING FILLER INTO A SELF-ADHESIVE COMPOUND, IN PARTICULAR A THERMALLY CROSSLINKABLE SELF-ADHESIVE COMPOUND, BASED ON NON-THERMOPLASTIC ELASTOMER

This is an application filed under 35 USC 371 of PCT/EP2019/056629, filed 15.Mar.2019, which claims priority to DE 102018204594.1, filed 27.Mar.2018. The present application claims all priority benefits of the foregoing identified applications, as well as incorporating the entirety of their disclosures herein by reference thereto.

The present invention relates to a process for the homogeneous incorporation of filler into an in particular thermally crosslinkable self-adhesive composition based on non-thermoplastic elastomer in a continuously operating assembly with a feed section and with a compounding section, where the typically solvent-free self-adhesive composition comprises at least one solid component, at least one liquid component and at least one filler.

Fundamental to the profile of performance requirements of pressure-sensitive adhesive systems, and to the pressure-sensitive adhesive products produced therewith, are the two physical phenomena of adhesion and cohesion of the pressure-sensitive adhesive layers. Technical terms used for types of adhesion are instant bond strength (tack) and adhesion (peel strength), and descriptive terms defined are "self-adhesive", "pressure-sensitive adhesive", and/or "pressure-sensitive adhesive tapes", and the correspondingly derived terms such as "pressure-sensitive-adhesive" and "self-adhesive composition", which imply long lasting adhesion under "gentle applied pressure". The terms "pressure-sensitive adhesive composition" and "self-adhesive composition" are used synonymously in the present application.

This property is achieved in particular in the case of pressure-sensitive adhesives based on natural rubber by admixture of tackifier resins (tackifier) and plasticizers (plastifying agents) with relatively low molecular weights.

The second defined property of pressure-sensitive adhesives is that, after use, they can in turn easily be peeled to leave no residue. This behavior is in essence determined by using, as elastomer component, high-molecular-weight rubber fractions which give the system the required strength in the form of cohesion (internal strength) on exposure to shear stress; this achieves particular importance for use of the products at relatively high temperatures and/or under relatively high mechanical loads. This property can be fortified by additional crosslinking, for example by way of ionizing radiation, reactive resin components or other chemical crosslinking agents.

The performance capability of the pressure-sensitive adhesive is therefore in essence determined via its balance relationship between adhesion properties and cohesion properties, and via compatibility, homogeneity and stability of the blend of composition constituents with extremely high and relatively low average molecular weights; this is relatively easy to achieve during production of the composition in mixing and kneading machines conventionally used in the sector, with use of solvents.

In contrast, solvent-free compounding and processes of self-adhesive compositions has become widely used in essence only for the processing of elastomers that melt, known as thermoplastic elastomers. The process for producing the composition in such cases is mostly carried out in twin-screw extruders at relatively high temperatures in the melt; coating is mostly achieved by means of slot dies. The advantage of using thermoplastic elastomers consists in essence in simplification of the spread-coating process. Because no combustible solvents are used, there is no need for drier systems with their costly energy use for evaporation and reclamation of the solvents, and there is no need to use explosion-protected plants. Hot-melt coating systems are compact and permit considerably higher spread-coating speeds. This is moreover an environmentally friendly technology where no solvent emissions arise.

Solvent-free compounding of thermoplastic elastomers in the prior art mostly uses block copolymers with polystyrene block fractions. This substance class has the advantage that the polystyrene domains present in the polymer soften above 100° C., whereupon the viscosity of the adhesive composition decreases greatly, thus providing good processability. After cooling to room temperature, the polystyrene domains are re-formed and provide a certain shear strength to the pressure-sensitive adhesives based on thermoplastic elastomers.

The thermoplastic elastomers can be compounded with adhesion-promoting hydrocarbon resins in the extruder process with fully satisfactory results. It is thus possible to achieve a desired level of adhesion with relative ease. However, the resultant pressure-sensitive adhesives remain sensitive to temperatures above 40° C. For the self-adhesive tapes produced on the above faces, this residue "creep behavior" is problematic for unrestricted shelf-life (blocking of the rolls in the stack, in particular during transport in relatively warm climatic zones) and for application at relatively high operating temperatures (for example as masking tapes in automobile painting, where despite close crosslinking such tapes lose their functional capability because the pressure-sensitive adhesive softens and the shear strength required for the fixing of the masking tapes is no longer ensured).

The known hot-melt pressure-sensitive adhesives based on block copolymers have therefore been able to achieve widespread use only for packaging tapes and labels for use at ambient indoor temperatures.

In contrast, the required shear strength values can be achieved with non-thermoplastic elastomers, for example natural rubber, but there is a long history of problems faced by the person skilled in the art attempting solvent-free production and processing of natural-rubber-based pressure-sensitive adhesives. Because the rubber comprises fractions with extremely high molecular weight (with $M_w \geq 1$ million), it has not been possible to use hot-melt pressure-sensitive adhesive technology to process solvent-free self-adhesive compositions, or else it has been necessary, before processing, to reduce (degrade) the molecular weight of the rubbers used to an extent so great that, as a consequence of this degradation, their suitability for high-performance self-adhesive compositions was lost.

The process described in EP 1 056 584 B2 permitted production of pressure-sensitive adhesive compositions based on non-thermoplastic elastomers, optionally with use of thermally reactive components, without any property-impairing degradation of the rubber and without the restricted application profile associated therewith for the resultant pressure-sensitive adhesive composition.

However, there is now often a requirement for mixtures (compounding materials) which are based on non-thermoplastic elastomers and comprise fillers. Because these often tend to agglomerate, production of compounding materials comprising fillers generally requires high shear energies or frictional energies within the compounding assembly in order to break up the agglomerates during compounding, and to comminute these and to disperse the individual filler particles uniformly in a polymer matrix, i.e. in order to permit incorporation of the fillers in finely dispersed form into the polymer matrix.

The shear energy required for dispersion, however, in many cases leads to a temperature increase and/or to degradation of the molar mass of the polymers; this is generally not desired, because it can disadvantageously influence the subsequent properties of the product. The effect of the shear energy in such cases increases with the viscosity of the polymer matrix.

An increase in the temperature of the polymer matrix is in particular always particularly undesirable when it comprises thermally activatable, i.e. thermal, crosslinking agents, and the temperature of the matrix is brought close to the temperature at which these crosslinking agents trigger the crosslinking process. This type of adhesive composition would change its properties in an undesirable manner, and because of increased viscosity would have poorer coating properties or would suffer complete loss of coatability, or would actually crosslink within the compounding assembly to such an extent that formation of a three-dimensional network already occurs, making it impossible to remove material from the machine or even in the worst case causing irreparable damage to the machine.

Even for a process that uses no thermal crosslinking agents, it can however be advantageous that the temperature of the polymer matrix is not excessively high after completion of compounding. This is the case by way of example when the compounding step is followed by in-line coating in which the process permits only certain upper temperature limits.

It was therefore an object of the present invention to provide a process which can incorporate fillers into self-adhesive compositions based on non-thermoplastic elastomers, and can also do so in the presence of thermally reactive components, where generation of heat is kept to a low level such that the resultant temperature rise of the compounded material does not disadvantageously affect the self-adhesive composition and in particular has no effect to any chemical crosslinking agents that may be present, so that crosslinking does not take place prematurely in an undesirable manner during production of the filler-containing self-adhesive composition, but instead takes place in a controlled manner at a desired subsequent juncture.

This object is achieved via a process as set out in main claim 1. The dependent claims here provide advantageous embodiments of the process. Finally, the concept of the invention also comprises self-adhesive compositions obtainable by the process of the invention.

Accordingly, the present invention provides a process for the homogenous incorporation of filler into an in particular thermally crosslinkable self-adhesive composition based on non-thermoplastic elastomer in a continuously operating assembly with a feed section and with a compounding section, where the self-adhesive composition comprises at least one solid component, at least one liquid component and at least one filler, and where the process comprises the following steps:
  (a) charging of at least one portion of the at least one solid component, for example in particular of non-thermoplastic elastomer, and optionally of a portion of the at least one liquid component, into the feed section;
  (b) transfer of the components from step (a) from the feed section into the compounding section;
  (c) optional addition of further solid components or of further portions of the solid components, typically by way of side-feed equipment, into the compounding section;
  (d) addition of the at least one liquid component into the compounding section, insofar as not yet charged in step (a) into the feed section;
  (e) production of a homogeneous self-adhesive composition in the compounding section; and
  (f) discharge of the self-adhesive composition
  characterized in that at least a portion of the at least one filler is added after predispersion in at least one dispersion liquid in a separate assembly, i.e. auxiliary assembly, the resultant dispersion being added into the compounding section. In a preferred embodiment, no liquid components are charged into the feed section.

It is preferable that the self-adhesive composition is thermally crosslinkable, i.e. forms a network at a suitable activation temperature.

The expression "solid components" here means components which at the juncture of their charging into the feed section or addition into the compounding section of the continuously operating assembly are in their solid physical state. Among the solid components are typically in particular non-thermoplastic elastomers, thermoplastic elastomers and aging inhibitors. Tackifier resins can also be added or charged in the form of solid component.

This is the case when the tackifier resin is added or charged below its softening point $T_E$. Typical softening points $T_E$ of tackifier resins are at least 40° C.

The expression "liquid components" in the invention accordingly means components which at the juncture of their charging into the feed section or addition into the compounding section of the continuously operating assembly are in their liquid physical state or are molten. Tackifier resins can therefore also be charged or added in the form of liquid component, specifically when they are added or charged above their softening point $T_E$, for example at 20 to 40° C. above their softening point $T_E$. The same applies analogously to various oligomers or polymers, for example non-thermoplastic or thermoplastic elastomers. Among the liquid components are moreover in particular plasticizers such as oils or fats, crosslinking agents, dyes or plasticizing resins.

From the above it is apparent that tackifier resins can be either solid component or liquid component. It is moreover possible that one and the same tackifier resin is added or charged both in the form of solid component and in the form of liquid component, depending on whether it is solid or liquid on addition or charging.

For the purposes of the present invention, the expression "dispersion liquid" means a substance or a substance mixture in which the filler is dispersed. In one embodiment, at the juncture of dispersion with the filler the dispersion liquid is already in its liquid physical state or is molten. Alternatively, the dispersion liquid can be a fusible or liquefiable substance/substance mixture which is initially introduced in solid form and mixed with the filler, whereupon the fusible or liquefiable substance/substance mixture is melted during, or following, mixing with the solid. The following are in particular used in the invention as dispersion liquid: plasticizers such as (mineral) oils or (molten) fats, plasticizing resins or, particularly preferably, (molten) tackifier resins.

It is preferable that a tackifier resin used as dispersion liquid is solid at ambient temperature and is converted to a melt by exposure to heat and shear energy before the filler is dispersed into said liquid. In another preferred embodiment, the dispersion liquid is a plasticizing resin which at ambient temperature is already soft to viscous. In this case, at the juncture of dispersion with the filler the dispersion liquid is already in its liquid physical state or is molten.

The word "fillers" in the present application typically means insoluble (solid) additives which are used during production of the self-adhesive compositions, usually in relatively large quantities. They can change properties of the self-adhesive compositions, for example their mechanical, electrical and/or processing properties (then being known as active fillers) or can leave the properties in essence unchanged (then being known as inert fillers). At the same time, they often reduce the cost of the product. Among fillers for the purposes of the present invention are also pigments and flame retardants.

In the process of the invention, filler is incorporated homogeneously into a self-adhesive composition. The compounding section provides a homogeneous self-adhesive composition. The term "homogeneous" here typically means that no agglomerated filler particles of any kind are optically discernible in the resultant self-adhesive composition, i.e. in particular discernible by the naked eye. The self-adhesive composition can be tested for homogeneity for the purposes of the present application by way of example as follows: a hot press is used to press 5 g of the self-adhesive composition between two process liners at 110° C. and a pressure of 5 bar. Process liners used here are PET films of thickness 75 μm coated on each side with differently graded silicone systems. After cooling, the pressed composite is dismantled, the thickness of the resultant layer of pressure-sensitive adhesive composition thus being about 50 μm. The layer is placed in front of a lamp. It is termed homogeneous if the eye cannot detect any filler particles across an area of extent 100 cm$^2$. This test should preferably moreover reveal no undispersed rubber particles and no unincorporated (tackifier) resin.

In the invention at least a portion of the filler(s) is predispersed in the dispersion liquid. It is particularly preferable that the entire quantity of filler(s) is predispersed in the dispersion liquid. The filler content of the resultant dispersion can in particular vary over a wide range, depending on the nature of the filler and on the nature of the dispersion liquid. Typical filler contents in the dispersions are 20 to 60% by weight, preferably 30 to 50% by weight, based in each case on the total weight of the dispersion.

The shear energy requirement for dispersion of fillers in the process of the invention is displaced from the actual compounding process and outsourced to an auxiliary assembly. This auxiliary assembly is preferably a continuously operating assembly, for example a twin-screw extruder or a planetary-gear extruder. These preferably have at least two barrels by way of which liquids and/or solids can be added at various locations, in particular continuously. A first addition is therefore the dispersion liquid, which is preferably a tackifier resin. This tackifier resin can already be in the molten state when it is added; alternatively, it is melted in the auxiliary assembly. This can occur before addition of the filler. However, it is also possible that tackifier resin and filler are first mixed, and that melting of the tackifier resin takes place during, and/or follows, the mixing procedure.

The dispersion liquid is therefore metered (as solid or as liquid or melt) into the auxiliary assembly, where one or more of the fillers present in the formulation, for example agglomerated fillers, is/are admixed with said liquid. Exposure to shear produces a filler dispersion which is typically free from agglomerates and which can then be introduced into the actual compounding process. No substantial further shear energy is then required for the dispersion of the filler within the polymer matrix; instead, the dispersion comprising filler that has now been disagglomerated can be incorporated at an energetic level sufficiently low to avoid any high shear that would undesirably reduce the molecular weight of the elastomers present in the formulation, or that would cause an impermissible temperature increase.

The present process therefore permits homogeneous incorporation of fillers into self-adhesive compositions, where evolution of heat in the actual compounding process is kept to low levels such that the resultant temperature rise of the compounded material does not adversely affect the self-adhesive composition, and in particular has no effect on any thermally reactive components that may be present, for example thermal crosslinking agents, so that crosslinking does not occur prematurely and undesirably during production of the filled self-adhesive composition but instead occurs in a controlled manner at a desired subsequent juncture.

The discharge temperature of the composition on discharge of the homogeneous self-adhesive composition from the assembly is accordingly usually at most 125° C., preferably at most 115° C. and with particular preference between 90° C. and 115° C. The discharge temperature of the self-adhesive composition is typically determined here by means of a sensor inserted into the discharged product.

Unlike in the conventional production processes, predispersion of the fillers in the dispersion liquid in the process of the present invention avoids undesired increased heat generation which can give rise to property-impairing reactions of the components used, in particular of the crosslinking agents. Before entry of the fillers into the compounding assembly, they are in disagglomerated state in the filler dispersion, and therefore do not have to be subjected to the effect of high shear energy in the actual compounding process. Instead of this, they are always processed together with the dispersion liquid. Dispersion liquids that can be used are by way of example plasticizers, for example oils, in particular mineral oils, or fats, and in particular tackifier resins or plasticizing resins; these are either used in liquid or molten form, or melting thereof is delayed and takes place during dispersion with exposure to shear energy and/or to external temperature change. Materials that can be used in the self-adhesive composition of the invention therefore include thermally activatable, i.e. thermal, crosslinking agents. The activation temperature of thermal crosslinking agents is typically above 50° C. The activation temperature of the thermal crosslinking agents used in the invention is preferably 100° C. to 180° C., with greater preference 110° C. to 160° C. and in particular 120° C. to 140° C.

It is moreover accordingly possible in the process of the invention by way of example to operate with lower screw rotation rates in the compounding assembly, i.e. continuously operating assembly, and/or to omit use of shear-inducing internals; this would otherwise lead to inadequate dispersion performance and to inhomogeneities within the polymer matrix.

For increased precision of metering of the dispersion into the compounding assembly, e.g. a planetary-gear extruder, it is advantageous for coupling to the discharge of the auxiliary assembly to use a commercially available pump of the type marketed by various manufacturers. This applies particularly when, because of its design, the auxiliary assembly cannot cope within the pressure loss involved in supplying material to the compounding assembly.

It is advantageous that the process of the invention can use a wide range of fillers, inclusive of pigments and flame retardants, and can also do so in thermally crosslinkable polymers whose processing temperatures naturally must be kept within limits.

(Nano)fillers that can be used are by way of silicon dioxide, aluminum oxide, titanium dioxide or phyllosilicates. Among other fillers that can be used advantageously in the invention are the oxides of the alkali metals, of the alkaline earth metals or of the transition metals, and mixtures of these oxides, and moreover organic fillers such as lignin, and mixtures of organic and nonorganic components, e.g. WPC (wood-plastics composites).

Fillers can be used by way of example to increase the cohesion of a pressure-sensitive adhesive composition. Fillers can also improve the dispersion of the polymers used. Fillers are moreover also admixed in order to increase weight or volume. Addition of filler often improves the technical usefulness of the products, and has an effect on their quality, for example strength, hardness, etc. Production of natural inorganic and organic fillers such as calcium carbonate, kaolin, dolomite and the like uses mechanical methods. Suitable fillers can also be used in rubber-based polymers to modify properties, for example hardness, strength, elasticity and elongation. Fillers frequently used are carbonates, in particular calcium carbonate, and also silicates (talc, clay, mica), silica, calcium sulfate and barium sulfate, aluminum hydroxide, glass fibers and glass beads, and also carbon blacks. Inorganic and organic fillers can also be distinguished by their density: the inorganic fillers often used in adhesive compositions, for example chalk, titanium dioxide, calcium sulfate and barium sulfate, increase the density of the composite.

There are also fillers that can reduce the overall density of the composite. Among these are hollow microspheres, which are highly voluminous lightweight fillers. The spheres contain by way of example air, nitrogen, carbon dioxide or hydrocarbons; the sphere shells frequently consist of glass or else of polymers.

The fillers described as bio-based or organic form another group of fillers. Materials preferably selected as plant-derived organic fillers are renewable feedstocks (renewable organic materials), in particular wood, cork, hemp, flax, grasses, reeds, straw, hay, cereals, maize, nuts or constituents of the abovementioned materials, for example shells (such as nut shells), kernels, bristles or the like. Use is made in particular advantageously of ground wood, ground cork, ground cereals, ground maize and/or ground potatoes, but no unnecessary restriction of the invention is intended to result from this list. Animal-derived organic fillers in particular used are bones, chitin (for example crab shells, insect shells), hair, bristles and horn, in particular in finely divided (ground) form.

Pigments that may in particular be mentioned are zinc oxide, titanium dioxide and carbon black; flame retardants that may in particular be used are metal hydroxides such as aluminum hydroxide and magnesium hydroxide, or antimony oxides. The filler contents of the self-adhesive compositions produced in the invention can vary greatly, and depend by way of example on the nature and function of the filler. Filler content, based on the entire self-adhesive composition, is typically up to 40% by weight, preferably 1 to 30% by weight, with greater preference 5 to 25% by weight and in particular 12 to 22% by weight.

For the process of the invention it is advantageous to use a continuously operating assembly, for example in particular a planetary-gear extruder, whose compounding section has been extended by combining at least two, with greater preference at least three and with particular preference at least four, coupled planetary barrel sections. On the one hand, this can provide full dispersion of the elastomer components, and also the desired homogenization and dispersion performance at cost-effective throughput rates, despite the presence of friction-reducing components for avoidance of any undesired rise in temperature of the polymer matrix; on the other hand, combination of preferably separately temperature-controlled planetary barrel sections can provide a balanced process temperature profile that permits use of thermally activatable crosslinking agent systems.

Planetary-gear extruders are highly advantageous because of the following: the large amount of surface-renewal for materials exchange and heat exchange, which permits rapid and effective dissipation of the energy introduced by way of friction, and also the short residence time and the narrow residence time range; they are therefore particularly suitable for compounding processes which must run in a particularly temperature-controlled fashion.

Embodiments and sizes of planetary-gear extruders vary, depending on the manufacturer. Diameters of the planetary barrel sections are typically between 70 mm and 400 mm, depending on desired throughput.

The planetary-gear extruders generally have a feed section and a compounding section. The feed section typically consists of a conveying screw onto which the solid components are continuously metered. The conveying screw then transfers the material to the compounding section. The region of the feed section with the screw is preferably cooled in order to avoid caking of material on the screw. However, there are also embodiments with no screw section, where the material is charged directly between central and planetary spindles. However, this is of no significance for the effectiveness of the process of the invention.

The compounding section of a planetary-gear extruder consists of a driven central spindle and a plurality of planetary spindles which rotate within a barrel section with oblique internal toothing around the central spindle. The rotation rate of the central spindle, and therefore the rotational velocity of the planetary spindles, can be varied and is therefore an important parameter for the control of the compounding process.

The materials are circulated between planetary spindles and oblique toothing of the barrel section, thus being dispersed to give a homogeneous compounded material with exposure to shear energy and exterior temperature control.

The number of rotating planetary spindles in each barrel section can be varied and thus adapted to suit the requirements of the process. The number of spindles influences the free volume within the planetary-gear extruder and the residence time of the material in the process, and moreover determines the size of the area available for exchange of heat and of materials. The number of planetary spindles has an influence on the result of compounding by way of the shear energy introduced. At constant barrel section diameter, a larger number of spindles can achieve better homogenization and dispersion performance or higher product throughput.

The maximal number of planetary spindles that can be installed between central spindle and barrel section depends on the diameter of the barrel section and on the diameter of the planetary spindles used. When relatively large roll diameters are used, of the type necessary to achieve production-scale throughput rates, or relatively small diameters are used for the planetary spindles, the barrel sections can be provided with a larger number of planetary spindles. For a roll diameter of D=70 mm up to seven planetary spindles are typically used, while with a roll diameter of D=200 mm for example ten planetary spindles can be used and with a roll diameter of D=400 mm for example 24 planetary spindles can be used.

In order to achieve a good relationship between quality of compounded material and output rate of product in the present invention, the number of planetary spindles to be used is preferably at least half, with particular preference indeed at least ¾, of the possible number.

For the process of the invention it is advantageous to use a planetary-gear extruder whose compounding section has been lengthened by combining at least two barrel sections. On the one hand, this can provide full dispersion of the elastomer components, and also the desired homogenization and dispersion performance at cost-effective throughput rates, despite the presence of friction-reducing components; on the other hand, combination of preferably separately temperature-controlled barrel sections can provide a balanced process temperature profile which permits used of thermally activatable crosslinking agent systems.

Introduction of the dispersion made of the at least one dispersion liquid and the fillers into the process is typically delayed until after dispersion of the solid components added for example by way of the feed section of the continuously operating assembly, e.g. planetary-gear extruder, has largely been achieved.

Various proportions by volume and by mass can be used in the composition of the dispersion. Selection of the fillers depends on the desired properties of the final product.

Each barrel section used in a planetary-gear extruder can be provided with a different number and type of planetary spindles, and can thus be adjusted to suit the respective requirement deriving from formulation and from process technology.

Between two combined barrel sections of a planetary-gear extruder there is generally a restrictor ring, through the open cross section of which the central spindle passes, and which retains, in fixed locations, the planetary spindles of a barrel section. Restrictor rings can have various open cross sections; the backpressure applied to the product, and therefore the fill level and, respectively, the amount of shear energy, can thus be varied and adapted to suit the requirements of the process. The restrictor rings can additionally have radial bores by way of which liquids, for example the dispersion comprising filler, plasticizer oils, or else inert gases such as oxygen, argon, carbon dioxide or the like, can be introduced into the compounding section of the planetary-gear extruder.

The central spindle, and also each barrel section, should preferably have one or more separate temperature-control or cooling circuits in order to allow establishment of a temperature regime that permits use of thermally activatable crosslinking systems. In cases where this is not necessary, the temperature-control circuits of combined barrel sections can also be connected to one another in order to minimize the number of temperature-control devices.

In the process of the present invention, at least a portion of, or for example all of, the elastomer components, and also optionally of associated aging inhibitors, is charged into the feed section of the continuously operating assembly, e.g. planetary-gear extruder. These substances can be added here to the compounding assembly either in the form of respectively separate components or else in the form of combined premix, or else in the form of partial premixtures. Metering of the components in the form of premix is particularly suitable when the components have similar supply forms and/or similar bulk densities, allowing the number of metering systems to be kept small. Premixes can easily be produced, for example in powder mixers. Familiar embodiments of metering systems operating volumetrically or gravimetrically are suitable for the metering of the individual solid components. Another possibility consists in addition of liquid components, or else only portions thereof, for example plasticizer oil, to a premix.

When a planetary-gear extruder is used, the materials metered into same are transported by the screw of the feed section into the first planetary barrel section of the planetary-gear extruder. Between each planetary barrel section it is possible to add liquid components by way of bores in the restrictor rings, for example plasticizer oils, plasticizing resins or resin melts. Both the degree of degradation of the elastomers and the compounding temperature of the pressure-sensitive adhesive composition can be influenced by way of the quantity of liquid that is already added before shear energy takes effect. By way of example, the extent of molecular weight degradation of the elastomers is particularly small when a liquid plasticizer is added before frictional energy has any kind of effect, i.e. said plasticizer is either added to a solid premix or the plasticizer oil is continuously metered into the system between feed screw and first planetary barrel section. Division of the liquid components in what is known as split-feed form across the length of the screw is also possible, and is another parameter for control of the process in respect of elastomer degradation and product temperature.

The dispersion made of at least one dispersion liquid and of the desired filler(s), or else only portions thereof, is/are introduced in a further step into the compounding section.

The process of the invention allows solvent-free production of self-adhesive compositions which comprise fillers and are capable of high performance and, in particular when linked to a downstream unit for coating and optionally for crosslinking, can achieve particular cost advantages in production of self-adhesive tapes capable of high performance.

It consists in essence of the steps set out above, which can optionally be carried out in an inert gas atmosphere.

The discharge temperature of the composition on discharge of the self-adhesive composition from the assembly is usually at most 125° C., preferably at most 115° C. and with particular preference between 90° C. and 115° C. The discharge temperature of the pressure-sensitive adhesive composition here is typically determined by means of a sensor inserted in the discharged product. The total residence time of the composition in the continuously operating assembly, for example in particular planetary-gear extruder, should not exceed a value of three minutes. The viscosity of the resultant hotmelt adhesive composition at 110° C. and for shear at 100 rad/s is between 30 000 and 150 000 Pa*s, in particular between 60 000 and 110 000 Pa*s.

Production of the adhesive composition is preferably followed by use of an applicator unit to coat the resultant typically solvent-free adhesive composition onto material in web form, for example in particular a backing in web form, to give an adhesive tape.

There are various processes for the coating of the materials in web form, the suitability of said processes depending on viscosity of the self-adhesive composition. Self-adhesive compositions with viscosities up to 5000 Pa*s for shear at 1 rad/s of the type obtained for example with use of relatively high proportions of plasticizer oils or via addition of thermoplastic elastomers to the non-thermoplastic elastomers, can be coated by means of an extrusion die downstream of the compounding assembly, and specifically a coathanger manifold die is preferably used as extrusion die. The extrusion die is accordingly also termed coating die, in accordance with its use. In order to obtain a defined application of composition over the entire area of the material in web form it is advantageous that the self-adhesive composition is subjected to devolatilization before entry into the extrusion die; this is particularly important when inert gases are used in the compounding assembly during the compounding process.

In the process of the present invention, the devolatilization takes place under the influence of vacuum, preferably in screw-based machines which can at the same time cope with the pressure losses due to piping systems and coating die. Single-screw extruders are particularly preferred for this purpose and moreover provide pressure regulation; coating of the (backing) materials in web form can thus be achieved with a very small range of variation of applied quantities of a composition.

Another possibility for the coating of the (backing) materials in web form with the self-adhesive composition produced by the process of the invention is use of roll-coating applicator units or multi roll coating calenders, consisting preferably of at least three coating rolls, with particular preference of four coating rolls, where the self-adhesive composition is molded to the desired thickness on passage through one or more nips for transfer to the material in web form. Preference is particularly given to this coating process when the viscosity of the self-adhesive composition exceeds values of 5000 Pa*s for shear at 1 rad/s, because coating with extrusion dies does not then provide the required precision in the quantity of composition applied.

Coating can take place by the co- or counter-rotational process, depending on the type of backing material in web form to be coated.

Suitable backing materials in web form for the self-adhesive compositions produced and processed by the process of the invention are any of the known backings, as required by the intended use of the adhesive tape, optionally with appropriate chemical or physical surface-pretreatment of the coating side, and also antiadhesive physical treatment or coating of the reverse side. Mention may be made by way of example of creped and uncreped papers, polyethylene films, polypropylene films, mono- or biaxially oriented polypropylene films, polyester films, PVC films and other films, foams in web form, for example made of polyethylene and polyurethane, woven fabrics, knitted fabrics and non-wovens.

Finally, the material in web form can be a bilaterally antiadhesive-coated material, an example being release papers or release films.

The thickness of the layer of self-adhesive composition on the material in web form can be between 10 μm and 2000 μm, preferably between 15 μm and 150 μm.

Finally, the self-adhesive composition can by way of example be applied in a thickness of 800 μm to 1200 μm on a release paper. This type of adhesive composition layer is, in particular after crosslinking, versatile in use as double-sided self-adhesive tape with no backing.

The coating procedure can take place on roll-coating applicators or multi roll coating calenders at temperatures below 100° C., and it is therefore also possible to coat self-adhesive compositions comprising thermally activatable crosslinking agents. In order to achieve increased freedom from gas bubbles in the coated adhesive composition, there can be a vacuum-devolatilization system installed between compounding assembly and applicator, for example a vacuum chamber, a devolatilizing extruder or the like.

Production of the composition and coating are advantageously combined with the crosslinking of the self-adhesive composition on the (backing) material in web form in a following process step, so that the resultant adhesive tape becomes shear-resistant and heat-resistant.

The self-adhesive composition can be crosslinked by ionizing radiation, for example by means of electron beams (EBC).

UV radiation can also be used for the crosslinking procedure; in this case, appropriate UV promoters must be added to the self-adhesive composition.

The crosslinking procedure particularly preferably uses thermally activatable, i.e. thermal, crosslinking agents with exposure to heat. By this method it is often possible to achieve particularly high performance capabilities of the self-adhesive composition. Thermal crosslinking is particularly advantageous by way of example when self-adhesive composition layers to be crosslinked are comparatively thick, because (in contrast to crosslinking by means of radiation) use of this method can typically avoid crosslinking gradients within the layer. Crosslinking via thermally activatable crosslinking agents with exposure to heat is also of particular interest when backings are EBC-sensitive.

The heating required for the thermal crosslinking of the self-adhesive composition can be achieved with the aid of the abovementioned techniques, in particular with the aid of high-temperature ducts, or else with the aid of infrared radiant sources or by means of high-frequency alternating magnetic fields, for example HF waves, UHF waves or microwaves.

The crosslinking of the pressure-sensitive adhesive composition can moreover be achieved by means of a combination of the abovementioned crosslinking techniques (ionizing radiation, UV radiation, thermally), an example being a combination of EBC crosslinking and thermal crosslinking.

A very shear-resistant pressure-sensitive self-adhesive composition is obtained, its properties being comparable with those of self-adhesive compositions of the same type produced by the solvent process.

The expression "self-adhesive composition based on non-thermoplastic elastomer" in the invention typically means a self-adhesive composition whose elastomer consists of at least 40% by weight, preferably at least 50% by weight, of non-thermoplastic elastomer. In a preferred embodiment, the elastomer present in the self-adhesive composition consists of at least 90% by weight, and in particular 100% by weight, i.e. exclusively, of non-thermoplastic elastomer. It is therefore possible to add a proportion by weight of typically 10 to 50% by weight, specifically based on the total elastomer content of the self-adhesive composition, of thermoplastic elastomers to the non-thermoplastic elastomers in order to improve processability. Mention may be made at this point especially of the particularly compatible grades of styrene-isoprene-styrene (SIS) and of styrene-butadiene-styrene (SBS) as representative examples.

The non-thermoplastic elastomer is advantageously selected from the group of the natural rubbers or of the synthetic rubbers; alternatively, said elastomer consists of any desired blend of natural rubbers and/or synthetic rubbers. The natural rubber(s) can in principle be selected from any of the obtainable grades, for example crepe grades, RSS grades, ADS grades, TSR grades or CV grades, as required by the necessary level of purity and viscosity. The synthetic rubber(s) can in particular be selected from the group of the randomly copolymerized styrene-butadiene rubbers (SBR), the butadiene rubbers (BR), the acrylonitrile-butadiene rubbers (NBR), the synthetic polyisoprenes (IR), the butyl rubbers (IIR), the halogenated butyl rubbers (XIIR), the acrylate rubbers (ACM), the ethylene-vinyl acetate copolymers (EVA) and the polyurethanes and/or blends of these.

Tackifier resin is often used in the production of the self-adhesive composition in particular for achieving suitable adhesion, for example in the case of self-adhesive compositions based on natural rubber. The person skilled in the art understands the term "tackifier resin" as meaning a substance which is based on resin and which increases tack. Typically used quantities of tackifier resin depend in particular on the nature of the elastomer used. In the case of certain types of elastomers, for example in particular acrylate rubbers (ACM), addition of tackifier resin is often omitted because said rubbers exhibit intrinsic tack. However, a total of 30 to 160 phr of tackifier resin, preferably 50 to 130 phr, with more preference 80 to 120 phr of tackifier resin, is generally used in the production of a self-adhesive composition of the invention. Within these ranges it is often possible simultaneously to achieve particularly good adhesion values and cohesion values.

The data in phr (parts per hundred rubber) provided in the present application are in all cases parts by weight of the relevant component, based on the total content of elastomer present in the self-adhesive composition.

Tackifier resins that can be used are any of the tackifier resins known hitherto and described in the literature. Mention may be made in particular of the colophonium resins and their disproportionated, hydrogenated, polymerized and esterified derivatives and salts, the aliphatic and aromatic hydrocarbon resins, polyterpene resins and terpene phenol resins. Any desired combinations of these and other resins can be used in order to achieve the properties of the resultant adhesive composition as desired. Reference may be made expressly to the description of the state of the art in "Handbook of Pressure Sensitive Adhesive Technology" by Donatas Satas (van Nostrand, 1989).

Examples of tackifier resins that can be used are in particular hydrogenated and non-hydrogenated hydrocarbon resins and polyterpene resins. Preferably suitable are inter alia hydrogenated polymers of dicyclopentadiene (for example Escorez 5300 range; Exxon Chemicals) and hydrogenated polymers of preferably $C_8$- and $C_9$-aromatics (for example Regalite and Regalrez ranges; Eastman Inc. or the Arkon P range; Arakawa). These can be derived through hydrogenation of polymers from pure aromatic streams, or else can be based through hydrogenation of polymers on the basis of mixtures of different aromatics. Other suitable materials are partially hydrogenated polymers of $C_8$- and $C_9$-aromatics (for example Regalite and Regalrez ranges, Eastman Inc. or Arkon M, Arakawa), hydrogenated polyterpene resins (for example Clearon M, Yasuhara), hydrogenated $C_5/C_9$-polymers (for example ECR-373, Exxon Chemicals) and aromatic-modified selectively hydrogenated dicyclopentadiene derivates (for example Escorez 5600 range; Exxon Chemicals). The abovementioned tackifier resins can be used either alone or in a mixture.

Hydrogenated hydrocarbon resins are particularly suitable as blend component for crosslinkable styrene block copolymers, as described by way of example in EP 0 447 855 A1, U.S. Pat. Nos. 4,133,731 A, 4,820,746 A, because the absence of double bonds prevents disruption of crosslinking.

It is moreover also possible, however, to use non-hydrogenated resins when crosslinking promoters, for example polyfunctional acrylates, are used. Under these conditions particular preference is given to the use of polyterpene resins based on α-pinene (Piccolyte A range from Hercules, Dercolyte A range from DRT), because these ensure not only high cohesion but also very high adhesion, even at high temperatures.

However, it is also possible to use other non-hydrogenated hydrocarbon resins, these being non-hydrogenated analogs of the hydrogenated resins described above. Colophonium-based resins can likewise be used by virtue of the preferred use of crosslinking promoters. Because these exhibit low adhesion at elevated temperatures, they are primarily used only as blend components.

Primary antioxidants (antioxidation agents), for example sterically hindered phenols, or secondary antioxidants, for example phosphites orthioethers, and/or C-radical scavengers, are usually added in order to stabilize the pressure-sensitive adhesive composition.

Plasticizers used can be any of the plasticizing substances known from adhesive tape technology. Among these are inter alia the paraffinic and naphthenic oils, (functionalized) oligomers such as oligobutadienes and -isoprenes, liquid nitrile rubbers, liquid terpene resins, plant- and animal-derived oils and fats, phthalates and functionalized acrylates.

As already explained above, in a preferred embodiment of the invention thermal crosslinking of the self-adhesive composition on the (backing) material in web form is combined, in a following process step, with production of the composition and coating, the resultant self-adhesive tape therefore being shear-resistant and heat-resistant (cf. claim 17).

For the purposes of the thermally induced chemical crosslinking procedure, i.e. thermal crosslinking, the process of the invention can use any of the thermally activable chemical crosslinking agents, i.e. thermal crosslinking agents, known hitherto, for example in particular accelerated sulfur systems or accelerated sulfur-donor systems, isocyanate systems, reactive melamine resins, reactive formaldehyde resins and (optionally halogenated) phenol-formaldehyde resins or reactive phenolic-resin or diisocyanate-crosslinking systems with the appropriate activators, epoxidized polyester resins and acrylate resins, and also combinations of these. In a particularly preferred embodiment of the thermal crosslinking of the self-adhesive composition, the thermal crosslinking agent forms a network with the non-thermoplastic elastomer, i.e. the network results from a reaction of the thermal crosslinking agent with the non-thermoplastic elastomer. In an alternative embodiment of the thermal crosslinking of the self-adhesive composition, the thermal crosslinking agent forms a network with thermoplastic elastomer present in the self-adhesive composition, i.e. the network results from a reaction of the thermal crosslinking agent with the thermoplastic elastomer. In another embodiment of the thermal crosslinking of the self-adhesive composition, the thermal crosslinking agent forms a network by itself, i.e. the network results from a reaction of the thermal crosslinking agent with itself. If a non-thermoplastic elastomer or a thermoplastic elastomer is to form a network with a thermal crosslinking agent, the elastomer must be thermally crosslinkable. This means that it must have functional groups which react with a suitable thermal crosslinking agent at a suitable temperature. Typical functional groups are in particular C=C-double bonds, epoxy groups, carboxylic acid groups, carboxylic anhydride groups, hydroxy groups, amino groups and mixtures thereof.

Temperatures at which the thermal crosslinking agents are activated in the invention are preferably 100° C. to 180° C., with more preference 110° C. to 160° C. and with very particular preference 120° C. to 140° C.

The invention will be described in more detail with reference to the examples and figures below, with no intention of any resultant restriction of the invention.

EXAMPLES

The compounding assembly used in the examples of the process of the invention (and also in the comparative example) was a planetary-gear extruder from ENTEX Rust & Mitschke GmbH. It consisted of a single-screw feed section (1) and four coupled planetary barrel sections (2a-2d) with length respectively 400 mm and with diameter in each case 70 mm. Between the planetary barrel sections there were restrictor rings (3a-3c) with differently dimensioned flow cross sections through which the compositions are passed during transition from the previous planetary barrel section into the respective following downstream barrel section. The restrictor rings (3a-3c) retain the planetary spindles of the extruder in fixed location and subject the composition to a certain shear effect.

The free flow cross section was 330 mm$^2$ in the case of the first restrictor ring (3a) between the first (2a) and the second planetary barrel section (2b), 185 mm$^2$ in the case of the second restrictor ring (3b) between the second (2a) and third planetary barrel section (2c), and 855 mm$^2$ in the case of the third restrictor ring (3c) between the third (2c) and fourth planetary barrel section (2d). The first two planetary barrel sections (2a, 2b) behind the feed section (1) were provided with respectively seven planetary spindles; the last two planetary barrel sections downstream (2c, 2d) respectively comprised six planetary spindles. The central spindle and the planetary barrel sections (2a-2d) respectively had their own temperature-controlled circuit. Water was used as temperature-control medium.

A twin-screw extruder (6) from LEISTRITZ with screw diameter 50 mm was used as separate assembly (auxiliary assembly) for dispersion of the fillers in examples of the process of the invention. The active screw length was 40*D (D=diameter of extruder screw). The solid resin to be melted was added by way of a commercially available gravimetric metering device into the aperture of the first barrel section; the fillers were metered into the system downstream, into an aperture of the fifth barrel section by way of commercially available gravimetric metering devices. Side-feed equipment was used in these examples to introduce the fillers into the twin-screw extruder.

The screw length for melting of the resin and for dispersion of the fillers into the resin melt was respectively 8*D. In these regions, the twin screws consisted of a combination of kneading-block units with 45°, 60° and 90° offset. The remainder of the screw consisted exclusively of closely intermeshing conveying elements.

The planetary-gear extruder was in each case coupled to an extrex EX 45-5 electrically heated melt pump from MAAG, which served as unit for discharge of the self-adhesive composition from the planetary-gear extruder. The self-adhesive composition produced in the planetary-gear extruder was transferred by way of this melt pump and a heatable hose to a low-shear twin-screw extruder (not shown in the figures) in which it was freed from air under the influence of vacuum. The devolatilizing twin-screw extruder was a ZE42×36D from Krauss Maffei Berstorff. It was operated with a barrel temperature of 110° C. The vacuum-dome pressure used for the devolatilization of the self-adhesive composition was below 10 mbar absolute.

FIG. 1 shows the structure of the planetary-gear extruder used and the location of addition of the components into the planetary-gear extruder in the comparative example. FIGS. 2 to 5 show the structure of the planetary-gear extruder used and of the twin-screw extruder (auxiliary assembly) for predispersion of filler, and also the respective locations of addition of the components into the planetary-gear extruder or twin-screw extruder in inventive examples 1 to 4. Details can be obtained from the description relating to the respective example (or comparative example).

Raw Materials Used

The raw materials listed in table 1 were used in inventive examples 1 to 4 and, respectively, the comparative example.

TABLE 1

Raw material used.

| | Name | Type | Producer |
|---|---|---|---|
| Elastomer | NR V 145 | Natural rubber | Weber&Schaer |
| | Nipol | Acrylonitrile-butadiene rubber | Zeon |
| | Vistanex | Butylene/isobutylene rubber | Exxon |
| | Elast SIS | Quintac (polystyrene-polyisoprene block copolymer) | Zeon |
| Adhesive resin | Regalite R1100 | Hydrocarbon resin | Eastman Chemical |
| | DT 110 | Terpene phenol resin | DRT |
| | Dercolyte S 115 | β-pinene resin | DRT |
| | Dertophene T | Terpene phenol resin | DRT |
| | Resin 100 | Colophonium resin (acid) | Diamantino Malho |
| Crosslinking-agent resin | PA 510 | Alkylphenol resin | SI-Group |
| Plastifying agent | Lanolin | Lanolin | Lanolines Stella |
| | Yellow oil (Ondina 919) | Hydrocarbon with complex variable composition | Shell |
| Filler | ZnO white | Zinc oxide | Lanxess |
| | Durafill 200 | Silicon dioxide | Grace |
| | MS 40 chalk filler | Calcium carbonate | Vereinigte Kreidewerke Dammann |

TABLE 1-continued

Raw material used.

| | Name | Type | Producer |
|---|---|---|---|
| Aging inhibitor | Irganox 1076 | Sterically hindered phenol | BASF SE |
| | Irganox 1726 | 2,4-bis(dodecylthiomethyl)-6-methylphenol | BASF SE |
| | MMBI | 2-Mercapto-4(5)-methyl-benzimidazole | Lanxess |
| | Sontal (LOWINOX ® AH25) | 2,5-di-tert-pentylhydroquinone | Addivant |

COMPARATIVE EXAMPLE

Formulation A stated in table 2 was used in the comparative example.

TABLE 2

Formulation A.

| Component | Composition TH 21 |
|---|---|
| NR V 145 | 46.5% |
| ZnO white | 9.3% |
| DT110 resin | 14.0% |
| S115 resin | 20.0% |
| Nipol | 4.7% |
| PA 510 resin | 4.7% |
| Sontal | 0.8% |

The natural rubber NR V 145, the filler zinc oxide (ZnO white) and the Sontal were metered into the single-screw feed section (1) of the planetary-gear extruder. The resins were metered in the solid state by way of side-feed equipment (4a-4c) into the respective apertures of the planetary barrel sections (2a-2c) of the planetary-gear extruder. The tackifier resin DT110 here was added in the first planetary barrel section (2a), the tackifier resin S115 was added in the second planetary barrel section (2b), and the crosslinking-agent resin PA 510 was added in the third planetary barrel section (2c).

The Nipol was preheated at 70° C. in a melting-tank unit (not shown) and metered continuously into the planetary-gear extruder by way of the melt pump integrated in the base of the melting tank into a bore of the restrictor ring (3b) located behind the second planetary barrel section (2b) and in front of the third planetary barrel section (2c).

FIG. 1 shows the division of the formulation constituents for the mode of operation selected here.

The total throughput of all components was 50 kg/h. The temperature of the cooling water in the entry to the central spindle was 8° C.; the entry temperature of the water for temperature-control of the planetary barrel sections (2a-2d) was 90° C.

The rotation rate of the central spindle was varied in a range between 70 revolutions per minute and 130 revolutions per minute. At no spindle rotation rate was it possible to obtain a homogeneous self-adhesive composition; instead, there were always undispersed agglomerates of zinc oxide discernible by the naked eye in the polymer matrix. At the highest rotation rate tested here, the temperature of the self-adhesive composition at discharge was 131° C.

Inventive Example 1

The formulation A was likewise used in the process of the invention for production of a high-temperature cloth tape based on cotton backing, but the zinc oxide (ZnO) was now first predispersed in a resin melt before it was added to the planetary-gear extruder.

The natural rubber NR V 145 and the Sontal were metered by means of gravimetric metering devices into the single-screw feed section (1) of the planetary-gear extruder. The tackifier resin DT110 was added by way of a side-feed extruder (4a) which had been coupled to the planetary-gear extruder at the upstream end of the first planetary barrel section (2a).

In the separate twin-screw extruder (6), the tackifier resin S115 was melted; ZnO white was mixed therewith downstream, and a homogeneous dispersion of zinc oxide in the resin melt was then produced. The twin-screw extruder (6) was operated with a screw rotation rate of 80 revolutions per minute and a barrel temperature of 170° C. The dispersion was then fed continuously into the planetary-gear extruder by way of an aperture (5) in the barrel-section wall at the ingoing end of the second planetary barrel section (2b).

As in the comparative example, the Nipol was preheated at 70° C. in a melting-tank unit and metered continuously into the planetary-gear extruder by way of the melt pump integrated in the base of the melting tank into a bore of the restrictor ring (3b) located behind the second planetary barrel section (2b) and in front of the third planetary barrel section (2c).

The crosslinking agent resin PA 510 was added by way of a further side-feed extruder (4c), which had been coupled on the third planetary barrel section (2c) of the planetary-gear extruder.

Figure 2:
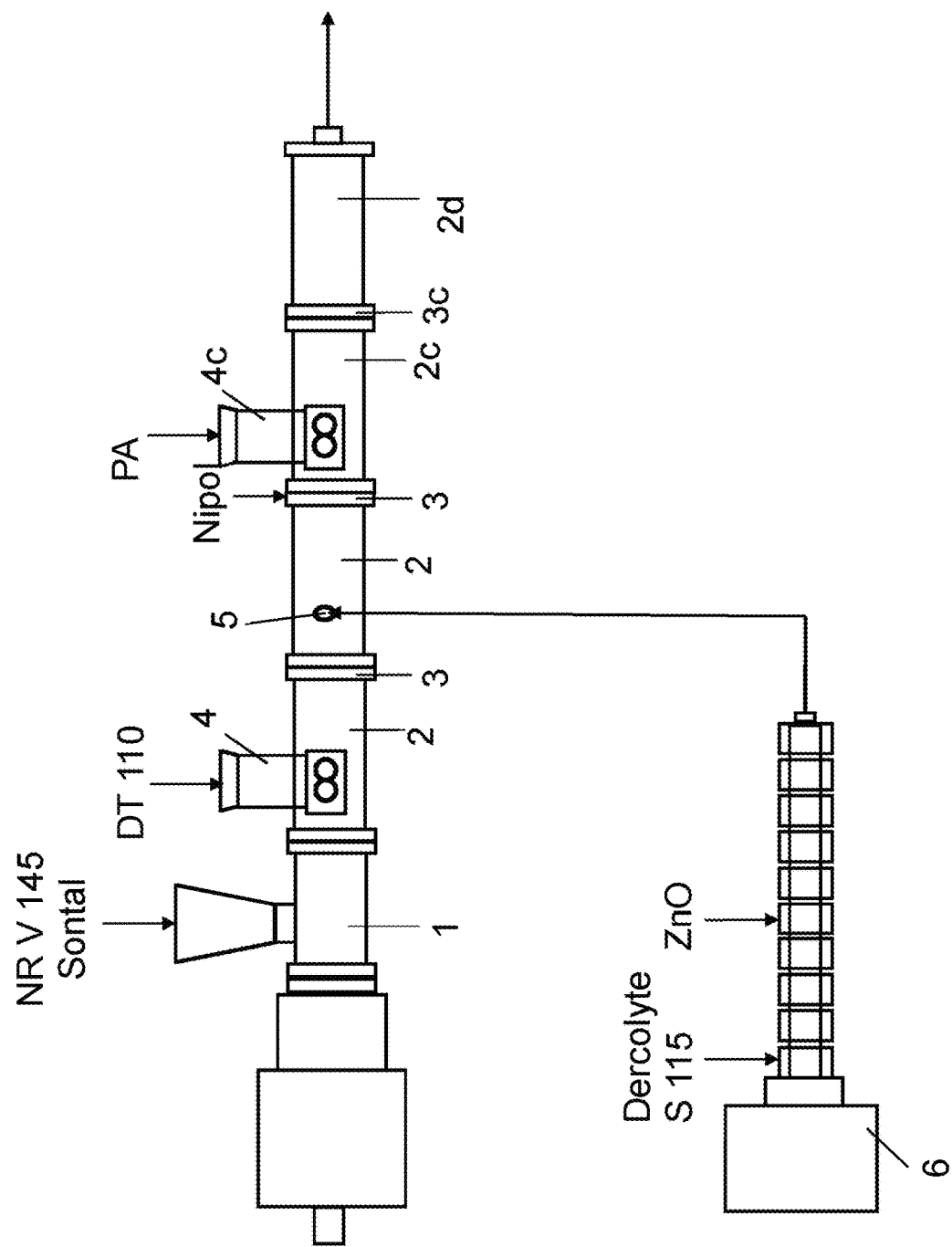

FIG. 2 shows the division of the formulation constituents for the mode of operation selected here.

The total throughput of all components was 50 kg/h. The planetary-gear extruder was operated with a rotation rate of the central spindle of 90 revolutions per minute. The cooling-water temperature in the entry to the central spindle was 8° C.; the entry temperature of the water for temperature-control of the planetary barrel sections (2a-2d) was 90° C.

The process of the invention gave a homogeneous polymer matrix in which no agglomerated particles of any kind were discernible optically, in particular by the naked eye. The discharge temperature of the self-adhesive composition obtained at the end of the planetary-gear extruder was 111° C.

The self-adhesive composition was then transferred by means of melt pump and heated hose to a turn-screw extruder in which it was freed from the included air by the effect of a 3 mbar vacuum.

Immediately after the production process, the self-adhesive composition, freed from air, was applied to a cotton backing with weight per unit area 200 g/m$^2$ and with layer thickness 120 μm which had been impregnated by processes conventionally used in the sector and which had a known release layer.

The method for coating of the adhesive composition was analogous to that in example 4, with an operating width of 300 mm. All rolls were temperature-controlled to 140° C. Coating speed was 50 m/min.

The adhesive bond strength of the resultant adhesive tape was 4.5-5.5 N/cm on steel and 2.0-2.5 N/cm on PE, and said tape was suitable as masking tape that withstands short periods of exposure to temperatures up to 140° C. The crosslinking delta of the adhesive composition at 180° C. crosslinking temperature was 10 000 Pa*s.

Inventive Example 2

The following formulation B (table 3) was used for production of general-purpose adhesive tapes with woven-fabric backings.

TABLE 3

Formulation B.

| Component | Composition La NRE146 |
| --- | --- |
| NR V 145 | 19.2% |
| Vistanex | 9.0% |
| Dertophene T | 15.0% |
| Resin 100 | 15.1% |
| Lanolin | 16.0% |
| Yellow oil | 3.8% |
| ZnO white | 20.5% |
| Irganox 1076 | 1.0% |
| MMBI | 0.5% |

The experimental setup used for production of this self-adhesive composition was analogous to that of example 1.

The elastomers NK V 145 and Vistanex, and also the aging inhibitors Irganox 1076 and MMBI, were metered continuously by way of gravimetric metering devices into the single-screw feed section (1) of the planetary-gear extruder. One third of the quantity of Resin 100, corresponding to 5% by weight, based on the entire formulation, was metered in the form of solid resin by way of a side-feed extruder (4a) into the first planetary barrel section (2a).

With extruder parameters the same as those in example 1, the zinc oxide white was dispersed in the Dertophene T resin and a partial quantity of the Resin 100 in the twin-screw extruder (6). To this end, the Dertophene T resin, and also two thirds of the resin quantity of Resin 100, corresponding to a proportion of 10.1% by weight, based on the entire formulation, were melted, and the entire quantity of zinc oxide was admixed therewith. The zinc oxide, finely dispersed in the resin melt, was then fed continuously into the planetary-gear extruder by way of an aperture (5) in the barrel-section wall at the ingoing end for the second planetary barrel section (2b).

The lanolin was liquefied in melting-tank equipment at 70° C. and metered by means of a metering pump into the planetary-gear extruder by way of a radial bore in the second restrictor ring (3b) located before the third planetary barrel section (2c).

The yellow oil was introduced into the planetary-gear extruder by way of a radial bore in the third restrictor ring (3c) located behind the third barrel roll section (2c).

Figure 3:
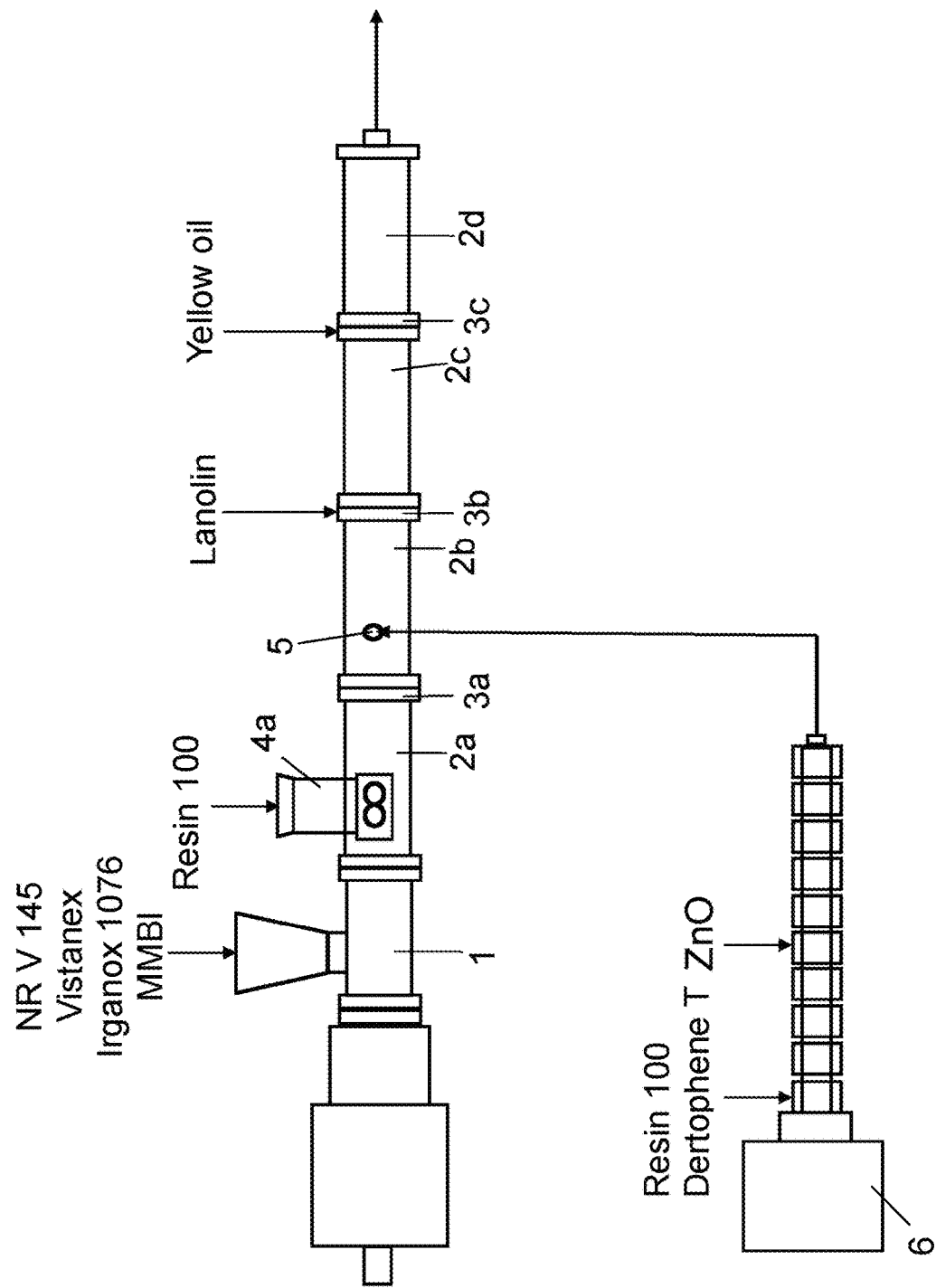

FIG. 3 shows the division of the formulation constituents for the mode of operation selected here.

The total throughput of all components was 50 kg/h. The planetary-gear extruder was operated with a rotation rate of the central spindle of 110 revolutions per minute. The cooling-water temperature in the entry to the central spindle was 8° C.; the entry temperature of the water for temperature-control of the planetary barrel sections (2a-2d) was 90° C.

The process of the invention gave a homogeneous polymer matrix in which no agglomerated particles of any kind were discernible optically, in particular by the naked eye. The discharge temperature of the self-adhesive composition obtained at the end of the planetary-gear extruder was 99° C.

The self-adhesive composition was transferred by means of a melt pump coupled to the planetary-gear extruder to a twin-screw extruder in which it was freed from air at a pressure of 3 mbar. This twin-screw extruder was operated with a rotation rate of 100 revolutions per minute. The barrel temperatures were 110° C.

The resultant adhesive composition was applied in a layer thickness of 115 μm to a woven viscose-cellulose fabric (viscose staple), on the reverse side of which there was a release lacquer conventionally used in the sector, and the weight per unit area of which was 240 g/m².

General-purpose woven-fabric adhesive tapes were produced by the process of inventive example 1. The woven viscose-cellulose fabric, instead of the cotton backing web, was passed here over the lay-on roll, and the adhesive layer of thickness 115 μm shaped by way of the roll-coating calender was then coated onto same. The coating procedure took place at 50 m/min at an operating width of 400 mm.

The adhesive bond strength of the resultant tape on steel is >4 N/cm, and said tape is suitable as general-purpose adhesive tape for a very wide variety of purposes.

Inventive Example 3

A double-sided carpet-laying tape based on woven fabric backing was produced with the formulation C (table 4).

TABLE 4

Formulation C.

| Component | Composition La NRE145 |
| --- | --- |
| NR V 145 | 28.2% |
| Dertophene T | 15.0% |
| Resin 100 | 15.1% |
| Lanolin | 16.0% |
| Yellow oil | 3.8% |
| ZnO white | 20.5% |
| Irganox 1076 | 1.0% |
| MMBI | 0.5% |

The experimental setup used for production of this self-adhesive composition was the same as that used in inventive example 2, except that this formulation comprised no Vistanex.

Figure 4:
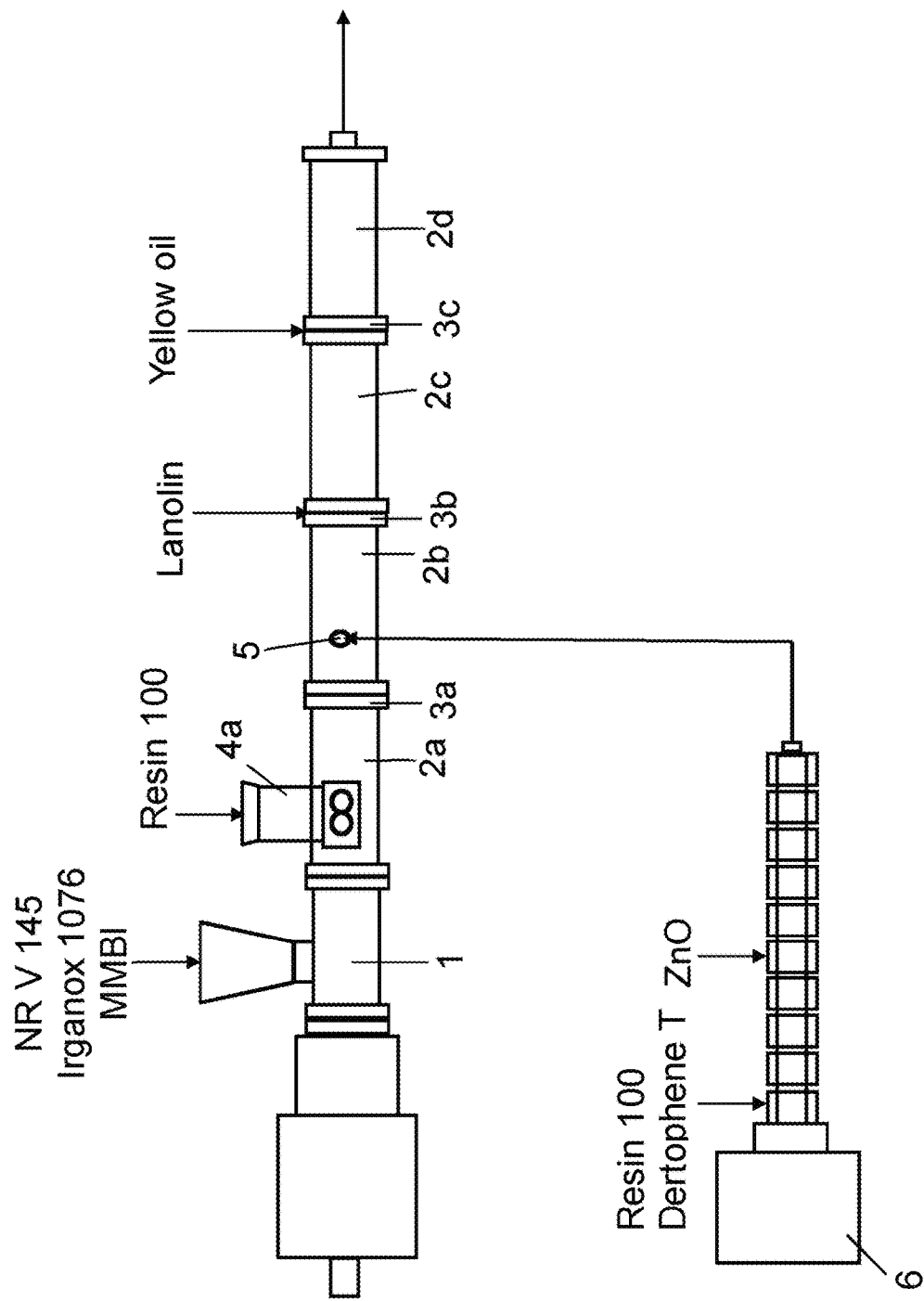

FIG. 4 shows the division of the formulation constituents for the mode of operation selected here.

The process of the invention gave a homogeneous polymer matrix in which no agglomerated particles of any kind were discernible optically, in particular by the naked eye. The discharge temperature of the self-adhesive composition obtained at the end of the planetary-gear extruder was 104° C.

After devolatilization of the self-adhesive composition as described in inventive example 2, the adhesive composition was applied bilaterally with the aid of transfer coating to a commercially available woven viscose-cellulose fabric (viscose staple), the weight per unit area applied being 130 g/m² with a layer thickness of 2×100 g/m².

A double-sided carpet-laying tape based on woven fabric backing was produced. A bilaterally siliconized release paper was directly coated with 100 μm by way of the process of inventive example 1. A lamination unit was used to laminate the viscose-staple material onto same, and in a second pass the composite was directly coated with 100 μm of adhesive application onto the open side. The coating speed was 30 m/min.

The adhesive bond strength of the resultant adhesive tapes on steel was >3.5 N/cm, and said tapes are suitable as double-sided adhesive tapes with tolerance-compensating and damping properties for a very wide variety of purposes.

Inventive Example 4

An adhesive tape for automotive applications, based on nonwoven polyester backing, was produced with the formulation D (table 5).

TABLE 5

Formulation D.

| Component | Composition La NRE145 |
|---|---|
| NR V 145 | 15.3% |
| Elast SIS | 15.3% |
| Regalite R1100 | 33.9% |
| Durafill 200 | 10.0% |
| MS 40 chalk filler | 25.0% |
| Irganox 1726 | 0.5% |

The two elastomers NR V 145 and Elast SIS were metered separately into the single-screw feed section (1) of the planetary-gear extruder.

The resin Regalite R1100 was melted continuously in the twin-screw extruder (6) at barrel temperatures of 170° C. The fillers Durafill 200 and MS 40 chalk filler were dispersed homogeneously into this resin melt at an extruder rotation rate of 130 revolutions per minute, and then metered into the planetary-gear extruder by way of an aperture (5) in the housing of the second planetary barrel section (2b).

The temperature of the second planetary barrel section (2b) was set to 140° C. in order to melt the Elast SIS; the temperature of the three other planetary barrel sections (2a, 2c, 2d) was 90° C. Temperature-control of the central spindle was achieved by contact with cooling water, the temperature of which was eight degrees.

The aging inhibitor Irganox 1726 was heated in a melting-tank unit to 70° C. and introduced into the process in the planetary-gear extruder by way of a radial bore in the second constrictor ring (3b) located between the second planetary barrel section (2b) and the third planetary barrel section (2c).

Figure 5:
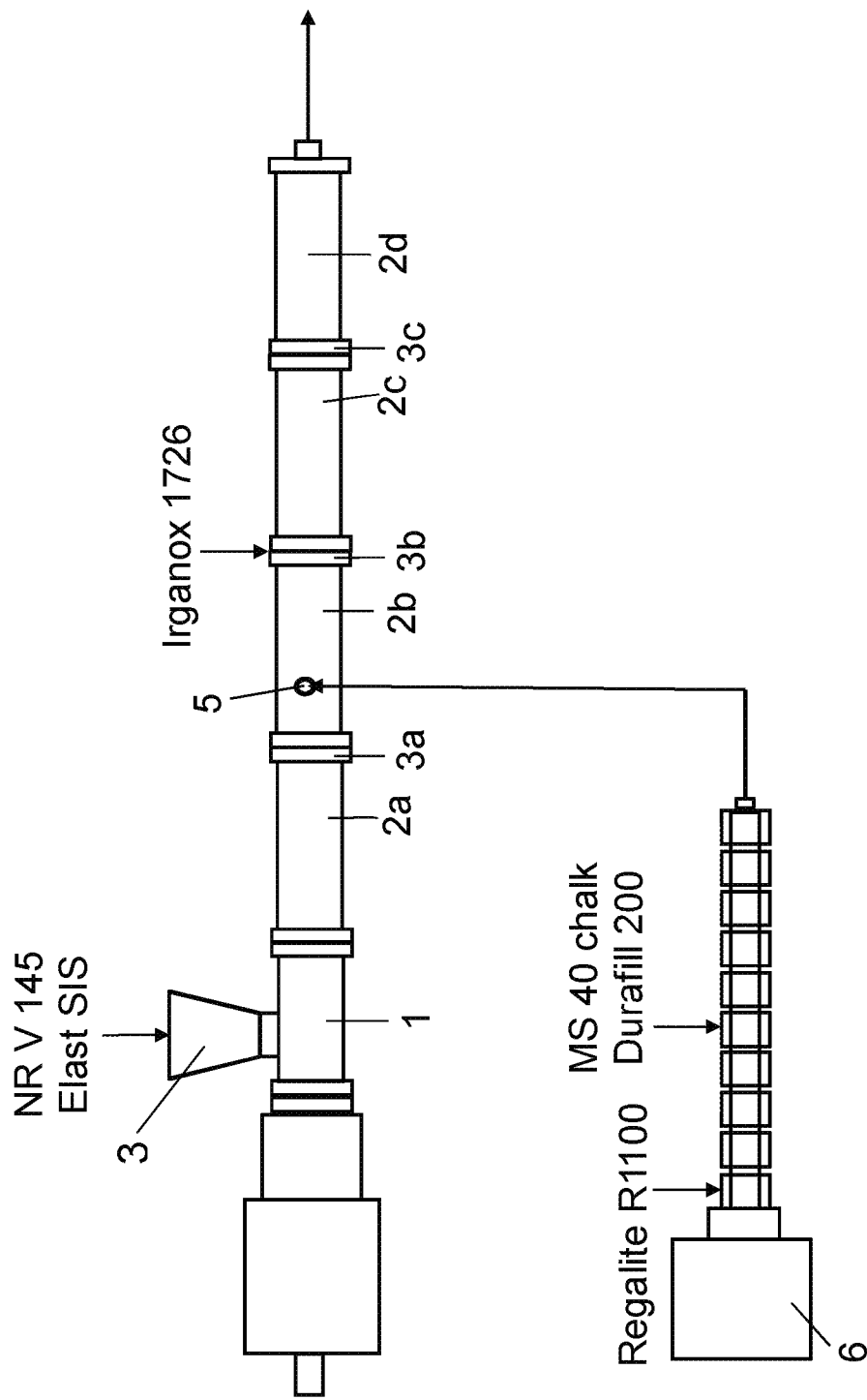

FIG. 5 shows the division of the formulation constituents for the mode of operation selected here.

The total throughput of all formulation components was 40 kg/h. For this formulation 4 the planetary-gear extruder was operated with a rotation rate of the central spindle of 110 revolutions per minute.

The process of the invention gave a homogeneous polymer matrix in which no agglomerated particles of any kind were discernible optically, in particular by the naked eye. The discharge temperature of the self-adhesive composition obtained at the end of the planetary-gear extruder was 123° C.

After devolatilization of the composition in a downstream twin-screw extruder as described in inventive example 3, the resultant adhesive composition was applied in a layer thickness of 70 μm to a polyester nonwoven (weight per unit area 70 g/m²).

Nonwoven polyester tapes were produced by the process of inventive example 1. The polyester nonwoven, instead of the cotton backing web, was passed here over the lay-on roll, and the adhesive layer of thickness 70 μm shaped by way of the roll-coating calender was then coated onto same. The coating procedure took place at 50 m/min at an operating width of 400 mm.

The adhesive bond strength of the resultant tape on steel is >3 N/cm, and said tape is suitable as adhesive tape for automotive applications.

Test Methods

Adhesive Bond Strength

Adhesive bond strength was determined as follows: A steel surface, a polyethylene surface (PE), a glass surface, a PVC surface and sandpaper with grit designation 600 (S600) were used as defined adhesion substrate. The adhesive tape to be tested was cut to size to give a width of 20 mm and a length of about 25 cm, provided with a handling tab, and then immediately pressed five times onto the respectively selected adhesion substrate by a 4 kg steel roller advancing at 10 m/min. A tensile tester (Zwick) was then immediately used to peel the adhesive tape from the adhesion substrate at an angle of 180° and with a peel velocity of 300 mm/min, and the force required for this was measured at room temperature. The measured value (in N/cm) was obtained as average value from three individual measurements.

For determination of the adhesive bond strength of an adhesive tape on the reverse side of same (ABSRS, adhesive bond strength on reverse side), a test strip was placed, while avoiding any contact with its reverse side, onto the test substrate, for example a steel plate. A second strip is then applied congruently to the reverse side of the first strip with avoidance of air inclusions, and is adhesive-bonded under five double passes of a 4 kg roller.

The measurement is made by peeling the upper test strip from the lower at a peel angle of 180° at a velocity of 300 mm/min, and determining the force required for this. The results of measurement are stated in N/cm and averaged across three measurements.

The same test is moreover carried out with the adhesive-bonded samples stored for 3 days at 23° C. and, respectively, 40° C. and thereafter conditioned to room temperature and then subjected to measurement as described above.

Softening Point $T_E$

The data relating to the softening point $T_E$, also termed softening temperature, of tackifier resins and of various oligomers or polymers relate to the ring-and-ball method in accordance with DIN EN 1427:2007 with appropriate use of the instructions (testing of resin sample instead of bitumen while in other respects retaining the same procedure); the measurements are made in a glycerol bath.

What is claimed is:

1. A process of homogeneously incorporating a filler into a thermally crosslinkable self-adhesive composition based on a non-thermoplastic elastomer in a continuously operating assembly with a feed section and with a compounding section having one or more sections downstream of the feed section, where the self-adhesive composition comprises at least one solid component, at least one liquid component and at least one filler, and where the process comprises the following steps:
- (a) charging of at least one portion of the at least one solid component, and optionally of a portion of the at least one liquid component, into the feed section;
- (b) transfer of the components from step (a) from the feed section into a section of the compounding section;
- (c) optional addition of further solid components or of further portions of the solid components into the compounding section;
- (d) addition of the at least one liquid component into the compounding section, insofar as not yet charged in step (a) into the feed section;
- (e) production of a homogeneous self-adhesive composition in the compounding section; and
- (f) discharge of the self-adhesive composition wherein, at least a portion of the at least one filler is added after predispersion in at least one dispersion liquid in a separate assembly which is a multiscrew extruder having at least one barrel section the resultant dispersion being added into a section of the compounding section.

2. The process of claim 1, wherein the dispersion liquid is at least one plasticizer selected from: oil, fat, plasticizing resin and/or tackifier resin.

3. The process of claim 1, wherein at least one of the solid components is non-thermoplastic elastomer, thermoplastic elastomer, tackifier resin, thermal crosslinking agent and/or aging inhibitor.

4. The process of claim 1, wherein at least one of the liquid components is non-thermoplastic elastomer, thermoplastic elastomer, plasticizer such as fat or oil, dye, plasticizing resin, tackifier resin and/or thermal crosslinking agent.

5. The process of claim 1, wherein the non-thermoplastic elastomer is selected from the group of the natural rubbers, the randomly copolymerized styrene-butadiene rubbers (SBR), the butadiene rubbers (BR), the acrylonitrile-butadiene rubbers (NBR), the synthetic polyisoprenes (IR), the butyl rubbers (IIR), the halogenated butyl rubbers (XIIR), the acrylate rubbers (ACM), the ethylene-vinyl acetate copolymers (EVA), the polyolefins, the polyurethanes and blends thereof.

6. The process of claim 1, wherein 10 to 50% by weight, based on the total elastomer content of the self-adhesive composition, of thermoplastic elastomer is charged alongside the non-thermoplastic elastomer.

7. The process according to claim 1, wherein in the compounding section at least one thermal crosslinking agent selected from sulfur crosslinking systems, accelerated sulfur crosslinking systems, reactive phenolic resin crosslinking systems and diisocyanate crosslinking systems is added.

8. The process of claim 1, wherein the filler is selected from oxides of alkali metals, oxides of alkaline earth metals or or oxides of transition metals, mixtures of these oxides and lignin.

9. The process of claim 1, wherein the self-adhesive composition is produced without solvent.

10. The process of claim 1, wherein the continuously operating assembly is a multiscrew extruder, and where the compounding section of the multiscrew extruder includes at least two coupled planetary barrel sections.

11. The process of claim 10, wherein the planetary barrel section of the planetary-gear extruder comprises at least half of the possible number of planetary spindles which may be present with the planetary barrel section.

12. The process of claim 1, wherein the entire quantity of the at least one filler is predispersed in the at least one dispersion liquid.

13. The process of claim 1, wherein the temperature of the self-adhesive composition on discharge from the continuously operating assembly is not in excess of 125° C.

14. The process of claim 1, wherein the self-adhesive composition is coated onto a material which takes the form of a web.

15. The process of claim 14, wherein the coating of the material which takes the form of a web is achieved with a roll unit or calender unit, where the self-adhesive composition is molded to the desired thickness during passage through one or more nips prior to transfer onto the material which takes the form of a web.

16. The process of claim 14, wherein in a process step downstream of the coating procedure, the self-adhesive composition is crosslinked.

17. A self-adhesive composition formed by the process of claim 1.

18. The process of claim 16, wherein the self-adhesive composition is thermally crosslinked.

19. The process of claim 2, wherein the dispersion liquid is at least one tackifier resin.

* * * * *